(12) United States Patent
Bui et al.

(10) Patent No.: US 8,636,214 B2
(45) Date of Patent: Jan. 28, 2014

(54) RECOGNITION OF ENCODED INFORMATION ON DOCUMENTS

(75) Inventors: Tuyen Bui, Cary, NC (US); Sharon C. Freedman, Cary, NC (US); Dean F. Herring, Youngsville, NC (US); Duane S. Miller, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 13/280,436

(22) Filed: Oct. 25, 2011

(65) Prior Publication Data

US 2013/0098996 A1    Apr. 25, 2013

(51) Int. Cl.
G06K 7/08 (2006.01)
G06K 9/00 (2006.01)
G06K 9/62 (2006.01)

(52) U.S. Cl.
USPC .......................... 235/449; 382/139; 382/209

(58) Field of Classification Search
USPC .......... 235/449, 454, 439; 382/139, 140, 207, 382/320; 327/552, 551, 52, 65, 179, 306
See application file for complete search history.

(56) References Cited

U.S. PATENT DOCUMENTS

| 3,212,058 | A | * | 10/1965 | Sanner ........................... 382/139 |
| 3,629,829 | A | | 12/1971 | Ordower |
| 4,053,737 | A | | 10/1977 | Lafevers et al. |
| 4,245,211 | A | * | 1/1981 | Kao ................................ 382/139 |
| 5,026,974 | A | | 6/1991 | Franklin et al. |
| 5,054,092 | A | | 10/1991 | LaCaze |
| 5,257,319 | A | * | 10/1993 | Canu et al. ..................... 382/139 |
| 5,479,532 | A | | 12/1995 | Abel et al. |
| 5,729,621 | A | | 3/1998 | Marshall et al. |
| 5,887,075 | A | * | 3/1999 | Kruppa ........................... 382/139 |
| 5,959,279 | A | | 9/1999 | Komatsu |
| 6,928,183 | B2 | | 8/2005 | Mitchell et al. |
| 7,377,425 | B1 | * | 5/2008 | Ma et al. ........................ 235/379 |
| 7,735,721 | B1 | | 6/2010 | Ma et al. |
| 7,865,009 | B2 | * | 1/2011 | Ozawa ............................ 382/139 |
| 8,180,137 | B2 | * | 5/2012 | Faulkner et al. ............... 382/139 |
| 8,345,947 | B2 | * | 1/2013 | Koretsune ...................... 382/140 |
| 2006/0043182 | A1 | * | 3/2006 | Kinoshita ....................... 235/449 |
| 2013/0071005 | A1 | * | 3/2013 | Tao et al. ........................ 382/139 |

FOREIGN PATENT DOCUMENTS

EP    81103612.8 A1    1/1982
JP    2005-78292 A1    3/2005

OTHER PUBLICATIONS

Arnold, RW, MICR Automatic Gain Control, IP.com Prior Art Database, IBM TDB, TDB 08-67, pp. 227-228, Aug. 1, 1967.

(Continued)

*Primary Examiner* — Michael G Lee
*Assistant Examiner* — Suezu Ellis
(74) *Attorney, Agent, or Firm* — Olive Law Group, PLLC; Thomas E. Tyson (57) ABSTRACT

Systems and methods for recognition of encoded information on documents are disclosed. According to an aspect, a system includes a document reader configured to read encoded information from a document, and to output an electrical signal representative of the encoded information. The system also includes signal conditioning modules that are each configured to receive the electrical signal, and to condition the received electrical signal differently for outputting a plurality of conditioned electrical signals. Further, the system includes an information recognition module configured to analyze each of the conditioned electrical signals and to select one of the conditioned electrical signals for use in recognizing the encoded information.

21 Claims, 4 Drawing Sheets

(56) References Cited

OTHER PUBLICATIONS

Hayosh, Thomas D., The MICR Expert Collection: vol. 2, Technical Papers Written and Presentations Given to the MICR Print Quality Study Group and the Signal Level Study Group of ANS X9B, Jul. 2, 1992.

Hayosh, Thomas D., Self-Authentication of Value Documents, Aug. 5, 1997.

* cited by examiner

RECOGNITION OF ENCODED INFORMATION ON DOCUMENTS

BACKGROUND

1. Field of the Invention

The present invention relates to encoded information, and more specifically, to recognition of encoded information on documents.

2. Description of Related Art

Various technologies are available for recognizing information encoded or written on documents, such as checks, deposit slips, surveys, tests, and the like. Examples of such information recognition technologies include magnetic ink character recognition (MICR) and optical mark recognition (OMR).

MICR allows computers to read information or characters from printed documents. MICR is commonly used by the banking industry or retailers to facilitate the processing of checks or other documents such as deposit slips. MICR characters are printed in special typefaces with a magnetic ink or toner, usually containing iron oxide. As a machine decodes the MICR text, it first magnetizes the characters in the plane of the paper. Subsequently, the characters or key data are passed over a MICR read head. As each character passes over the MICR read head, it produces a unique waveform that can be identified by the MICR system.

The quality and types of documents containing encoded information can vary widely. For example, MICR character signal strength can range more than seven times from one check to another. Such variances can complicate accurate character recognition. In the example of signal strength variations, low signal strength checks have signal amplitude close to the noise level, and the noise amplitude can interfere with proper character recognition. On the other hand, high signal strength checks can cause clipping in an analog amplifier circuit of the MICR system, which may cause erroneous character recognition. Another difficulty encountered with MICR character recognition can occur when checks or other documents are printed by laser printers, which can cause incorrect recognition results because individual rows of dots can appear as several smaller peaks rather than fewer larger peaks. Use of OMR technology may also be prone to erroneous recognition results for similar reasons. In view of these difficulties, there is a need for improved MICR character recognition and for improved recognition of encoded information on documents in general.

BRIEF SUMMARY

One or more embodiments of the present invention provide methods and systems for recognition of encoded information on documents. According to an aspect, a system includes a document reader configured to read encoded information from a document, and to output an electrical signal representative of the encoded information. For example, a MICR read head may read magnetically encoded characters printed on a document. The system also includes signal conditioning modules that are each configured to receive the electrical signal, and to condition the received electrical signal differently for outputting multiple conditioned electrical signals. For example, multiple, different signaling conditioning modules may receive an electrical signal output by the MICR read head for filtering, amplifying, and/or otherwise conditioning the electrical signal differently. Further, the system includes an information recognition module configured to analyze each of the conditioned electrical signals and to select one of the conditioned electrical signals for use in recognizing the encoded information. Using the selected electrical signal(s), the information recognition module may determine the encoded information.

DETAILED DESCRIPTION

Exemplary systems and methods for recognizing encoded information on documents in accordance with embodiments of the present invention are disclosed herein. Particularly, described herein is a system including a document reader configured to read encoded information from a document, and to output an electrical signal representative of the encoded information. An example document reader may be a magnetic reader operable to read magnetically encoded information from a document. In another example, a document reader may be an optical reader operable to read visually encoded information from a document. The system may also include multiple signal conditioning modules that are each configured to receive the electrical signal, and to condition the received electrical signal differently for outputting multiple, conditioned electrical signals. For example, the system may include one or more filters and/or one or more amplifiers that are each operable to condition an electrical signal differently from one another. The system may also include an information recognition module configured to analyze each of the conditioned electrical signals, and to select one of the conditioned electrical signals for use in recognizing the encoded information. The information recognition module may also determine the encoded information based on the selected, conditioned electrical signal.

As referred to herein, the term "document" refers broadly to any sheet of material onto which encoded information is deposited or otherwise affixed thereto. For example, a document may be a sheet of paper having magnetically encoded information, such as MICR characters, printed thereon. In another example, a document may be a sheet of paper having human-marked data or other visually encoded information, such as a survey or test including markings written by a human.

As referred to herein, the term "document reader" refers broadly to any type of equipment or system capable of reading encoded information from a document. An example document reader may be a magnetic reader operable to read magnetically encoded information from a document. A MICR read head is an example of a magnetic reader. In another example, a document reader may be an optical reader operable to read visually encoded information from a document. An example optical reader is an optical mark recognition (OMR) device.

As referred to herein, the term "signal conditioning module" refers broadly to any type of electronics or circuitry configured to manipulate an electrical signal in such a way that the electrical signal meets the requirements of a next or subsequent stage for further processing. Signaling conditioning examples include, but are not limited to, amplification, filtering, converting, range matching, isolation, the like, and combinations thereof A signal conditioning module may include any number and type of circuit component, such as, but not limited to, an operational amplifier (op-amp), resistor, capacitor, inductor, transistor, and the like. A signaling conditioning module may also include input terminals for receipt of an electrical signal for conditioning, and output terminals for output of a conditioned electrical signal to a next or subsequent stage.

Figure 1:
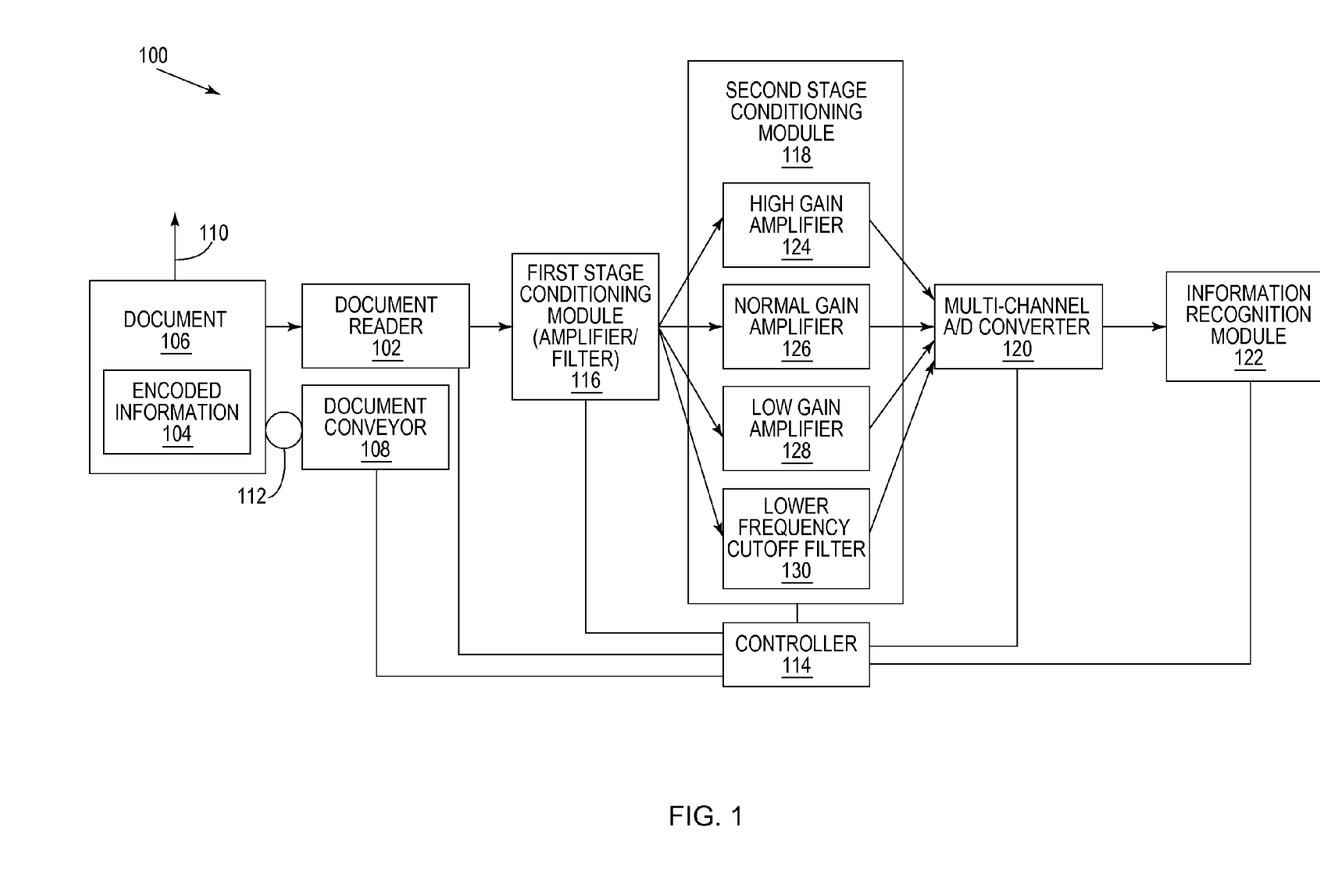
FIG. 1 is a block diagram of an example document reader system 100 in accordance with embodiments of the present invention.

FIG. 1 illustrates a block diagram of an example document reader system 100 in accordance with embodiments of the present invention. Referring to FIG. 1, the system 100 includes a document reader 102 configured to read encoded information from one or more documents. For example, the document reader 102 may read encoded information 104 from a document 106. The encoded information 104 may include one or more magnetically inked characters on a surface of the document 106. The system 100 may include a document conveyor 108 configured to receive the document 106 and to move the document 106 along a pathway direction 110. As the document 106 is moved along the pathway direction 110, the document reader 102 may read the encoded information 104. The document conveyor 108 may include one or more rollers 112, any suitable document track system, or other suitable mechanism for moving the document 106 along the pathway direction 110. Alternatively, for example, the document 106 may be suitably positioned for read by the document reader 102. In another example, the document 106 may be held stationary while the document reader 102 is moved with respect to the document 106 during read by the document reader 102. For simplification of illustration, only a single document is shown, but it should be understood that in practice, the document conveyor 108 may convey multiple documents for read of encoded information by the document reader 102.

The system 100 may include a controller 114 configured to control various components of the system 100. For example, the controller 114 may control the document conveyor 108 and one or more motors for moving the rollers 112 such that the document 106 is moved along the pathway direction 110. The controller 114 may also control the document reader 102 for reading encoded information from documents and for outputting electrical signals representative of encoded information. Further, the controller 114 may control a first stage conditioning module 116, a second stage condition module 118, a multi-channel analog-to-digital (A/D) converter 120, and an information recognition module 122, all of which are described in more detail herein. The controller 114 may include hardware, software, or firmware configured to execute instructions for controlling components of the system 100. For example, the controller 114 may include one or more processors and memory. The processor(s) may be configured to execute computer program instructions residing on the memory for controlling system components and for implementing various aspects of embodiments of the present invention described herein.

In an example, the document reader 102 may include a MICR read head configured to read magnetically encoded characters printed on a document, such as the document 106. In this example, the MICR read head may be a magneto-resistive device, and the document 106 may be moved by the document conveyor 108 at a suitable speed relative to the MICR read head such that the encoded information can be read. In this example, the document 106 may be a check or deposit slip that includes certain key data printed thereon in magnetic ink in particular fonts, such as E13B. The key data may include, but is not limited to, a bank number, customer account number, document or check number, and the monetary amount of the document, for example.

As the document 106 is moved generally along the pathway direction 110 past the document reader 102, the document reader 102 may read the encoded information 104 and may generate and output waveforms or electrical signals that are representative of the encoded information 104. In an example, the encoded information 104 may include multiple characters printed in a particular font. The characters may be read by the document reader 102. Further, in this example, the document reader 102 may generate and output an electrical signal such that each character has its own unique waveform.

It is noted that although many of the examples described herein relate to use of a magnetic reader configured to read magnetically encoded information on a document, embodiments of the present invention disclosed herein may be using any other suitable type of document reader such as, but not limited to, an optical reader. In the example of an optical reader, a document for read may include visually encoded information. The visually encoded information may be suitably printed or otherwise marked on a document. The optical reader may read the visually encoded information and output an electrical signal representative of the visually encoded information. For example, the output electrical signal may be waveforms representative of characters within a particular font. Other suitable document readers may read the encoded information and similarly output an electrical signal representative of the visually encoded information.

In the case of MICR characters, it is noted that the form and quality of the characters may be standardized, as well as the position to which they are printed on a document, such as a check. It is therefore possible to obtain waveforms corresponding to the MICR characters by scanning particular portions of the document with the MICR read head. As described in further detail below, the printed data can subsequently be identified by analyzing these waveforms. In an example, a magnet may be passed over portions in which the MICR characters are printed to magnetize the MICR characters prior to scanning with the MICR read head. The controller 114 may control the document conveyor 108 to position a document for read of these portions by the document reader 102.

The first stage conditioning module 116 may include electronics or circuitry configured to amplify, filter, and/or otherwise condition the waveforms or electrical signals output by the document reader 102. For example, the first stage conditioning module 116 may include an amplifier circuit configured to amplify the electrical signals output by the document reader 102. Further, for example, the first stage conditioning module 116 may include a filter circuit configured to remove various noise components and extraneous signals from the electrical signals output by the document reader 102. The first stage conditioning module 116 may also include various other electronics or circuitry for conditioning the output electrical signals.

In another example of conditioning the electrical signal output by the document reader 102, the first stage conditioning module 116 may include a filter having one or more op-amp stages connected in series. A first op-amp in the series may connect directly to the output of the document reader 102. For example, the first op-amp may connect directly to output terminals of the MICR read head. The output of the first op-amp may be capacitively coupled to the second stage conditioning module 118.

The first stage conditioning module 116 may also distribute the conditioned electrical signal to each one of multiple signal conditioning modules within the second stage conditioning module 118. For example, output terminals of the first stage conditioning module 116 may be electrically connected to each input of a high gain amplifier 124, a normal gain amplifier 126, a low gain amplifier 128, and a filter 130. Thus, each of the amplifiers 124, 126, and 128, and the filter 130 may receive the same electrical signal output by the first stage conditioning module 116.

Each of the modules of the second stage conditioning module 118 may have a conditioning function such as, but not limited to, an amplifier, filter, any other signaling condition circuit, or combinations thereof. Further, the second stage modules may condition their received electrical signal differently from one another for managing various anomalies that can occur when reading MICR characters or other encoded information. For example, one second stage module may provide a high amplitude signal for low signal strength documents, and another second stage module may provide a high filter characteristic for eliminating noise. In an example, the high gain amplifier 124 may be configured with high gain to compensate for a low signal. In another example, the low gain amplifier 128 may be configured with low gain to prevent signal clipping for high amplitude documents. In yet another example, the filter 130 may be configured with low frequency filter characteristics to manage various types of documents, such as laser printed checks. The second stage modules may each output a differently-conditioned analog signal.

In accordance with embodiments of the present invention, any of various types and numbers of second stage conditioning modules may be employed. For example, two additional conditioning modules may be employed within the second stage conditioning module 118. In this example, the modules may be configured with a similar lower frequency cutoff as filter 130 with one having a higher gain and the other having a lower gain. Such variations in the types and numbers of second stage conditioning modules can accommodate signal differences in various documents types, such as, but not limited to, laser printed checks.

Outputs of the amplifiers 124, 126, and 128, and the filter 130 may be electrically connected to an input of the A/D converter 120. The A/D converter 120 may receive each of the analog signals output by the amplifiers 124, 126, and 128, and the filter 130, and may convert the analog signals to digital values. For example, the A/D converter 120 may include multiple inputs for receipt of the analog signals and may sample the analog signals such that all of the outputs from the second stage conditioning module 118 are sampled at the same time during a single pass of a document past the document reader 102. The A/D converter 120 may subsequently convert the signals to a digital signal including multiple channels that are each representative of the analog signals output by the amplifiers 124, 126, and 128, and the filter 130. Further, an output of the A/D converter 120 may be electrically connected to the information recognition module 122 for communication of the multi-channel digital signal to the information recognition module 122.

The information recognition module 122 may receive the multi-channel digital signal output by the A/D converter 120 for use in recognizing the encoded information 104. The information recognition module 122 may analyze the electrical signals on each of the channels output by the A/D converter 120 and select one or more of the electrical signals for use in recognizing the encoded information 104. The encoded information 104 may be determined based on the selected electrical signal(s).

An electrical signal may be selected for use in recognizing encoded information by, for example, finding and comparing signal peaks, relative amplitudes, and relative positions in the data stream and comparing this data to a template. For example, the information recognition module 122 may determine or have information indicating that the beginning of each MICR character will be approximately 100 samples apart based on the document roller 112 size, the document conveyer 108 speed, and the sample period for the A/D converter 120. The information recognition module 122 may also determine or have information indicating, based on the character width specified in the E13B standard as an example, that there can be expected to be approximately 30 samples of 'blank space' in the 100 samples. Initially, the information recognition module 122 may frame the data from the A/D converter 120 such that each block of 100 samples contain all the samples for a single MICR character. The information recognition module 122 may implement this by searching the data to find positive peaks outside the 'noise band', which is +/−4 bits out of 256 bits. When moving a blank document past the read head, the A/D output can be 128 +/−4 bits, due to foreign material on the paper being scanned and/or electrical noise. A signal peak is recognized when a sample is above or below the noise band. As the data is scanned looking for peaks indicating the start of characters, the number of samples between starting peaks is monitored to ensure it is near 100. The algorithm implemented by the information recognition module 122 can allow minor adjustment to the 100 sample rule to account for document slippage and roller diameter tolerance and it does this on a character-to-character basis, but too many peaks may confuse the algorithm and result in a 'fail to read' error. Once the leading edge of each character is found and positioned to the start of the 100 samples, the other peaks (positive and negative) are found and the locations noted. Each MICR character template is nominally 70, 60, 50 or 40 samples wide (depends on the character) and has a characteristic number of positive and negative peaks. Once the number and location of all peaks are known, some of the possible templates may be eliminated such that a character can match.

At this point, each batch of 100 samples may have several template possibilities (typically 2 to 4) because most of the 13 possibilities were eliminated in the previous step. Subsequently, the peaks are normalized to allow comparison to a template. Normalization may be necessary to compensate for the variation in peak amplitudes caused by differences in MICR printing, wear, and the like. The process of comparing the normalized peaks to the possible templates uses a scoring process where extra, missing, short or tall peaks can be accounted for so that the scores for each template may be compared to determine the best choice.

Figure 2:
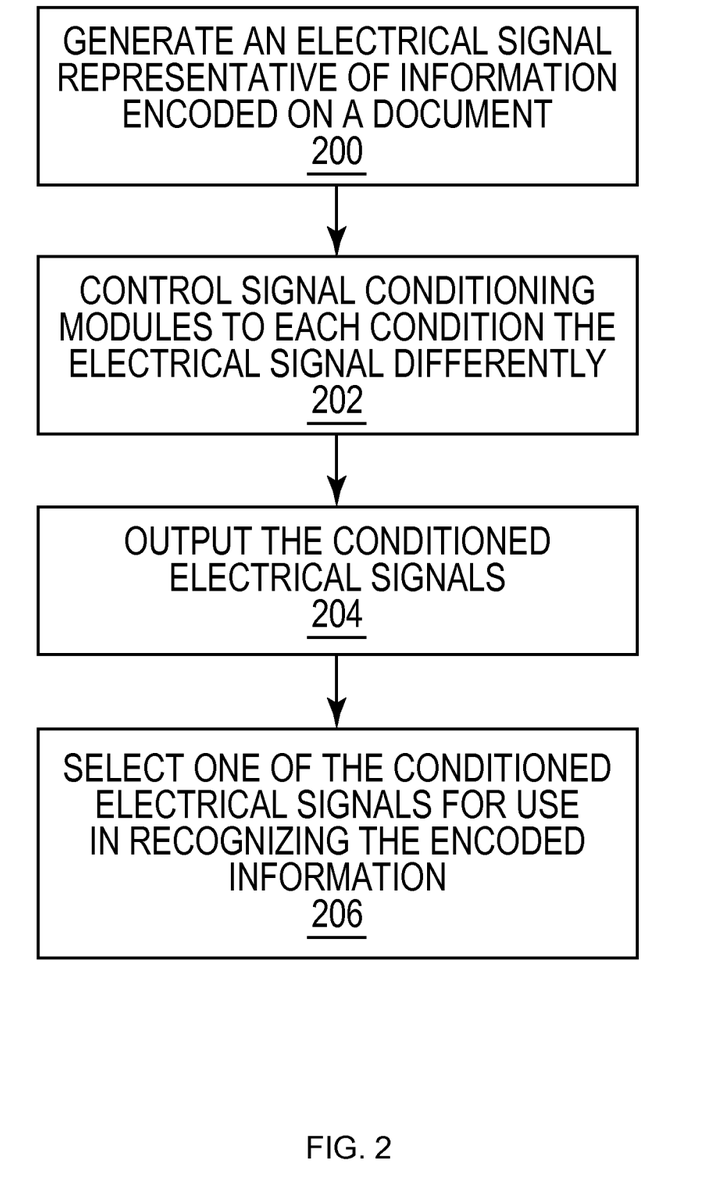
FIG. 2 is a flowchart of a method for recognition of encoded information on a document in accordance with embodiments of the present invention.

In accordance with embodiments of the present invention, FIG. 2 illustrates a flowchart of a method for recognition of encoded information on a document. The method of FIG. 2 is described as being implemented by the document reader system 100 shown in FIG. 1, although the method may be implemented by any suitable document reader system. The method may be implemented by components of the document reader system 100.

Referring to FIG. 2, the method includes generating 200 an electrical signal representative of information encoded on a document. For example, the controller 114 may communicate control instructions to the document reader 102 for reading the encoded information 104 on the document 106. The controller 114 may also communicate control instructions to the document conveyor 108 for moving the document along the pathway direction 110 and for positioning the document 106 such that the encoded information 104 can be read by the document reader 102. The control instructions may coordinate the movement of the document 106 and the reading of the encoded information 104. In response to receipt of the control instructions, the document reader 102 may read the encoded information 104 and output an electrical signal representative of the encoded information 104.

The method of FIG. 2 includes controlling 202 signal conditioning modules to each condition the electrical signal differently. For example, the controller 114 may control each of the modules of the second stage conditioning module 118 to condition the electrical signal output by the first stage conditioning module 116. Such control may include communicating a signal to one or more of the second stage conditioning modules for enabling operation. The method of FIG. 2 also includes outputting 204 the conditioned electrical signals. For example, the conditioned electrical signals may be output by each of the second stage conditioning modules.

The method of FIG. 2 includes selecting 206 one of the conditioned electrical signals for use in recognizing the encoded information. For example, the information recognition module 122 may select an electrical signal from one of the modules of the second stage conditioning module 118 for use in recognizing the encoded information 104. Subsequently, for example, the information recognition module 122 may determine the encoded information based on the selected electrical signal.

Figure 3:
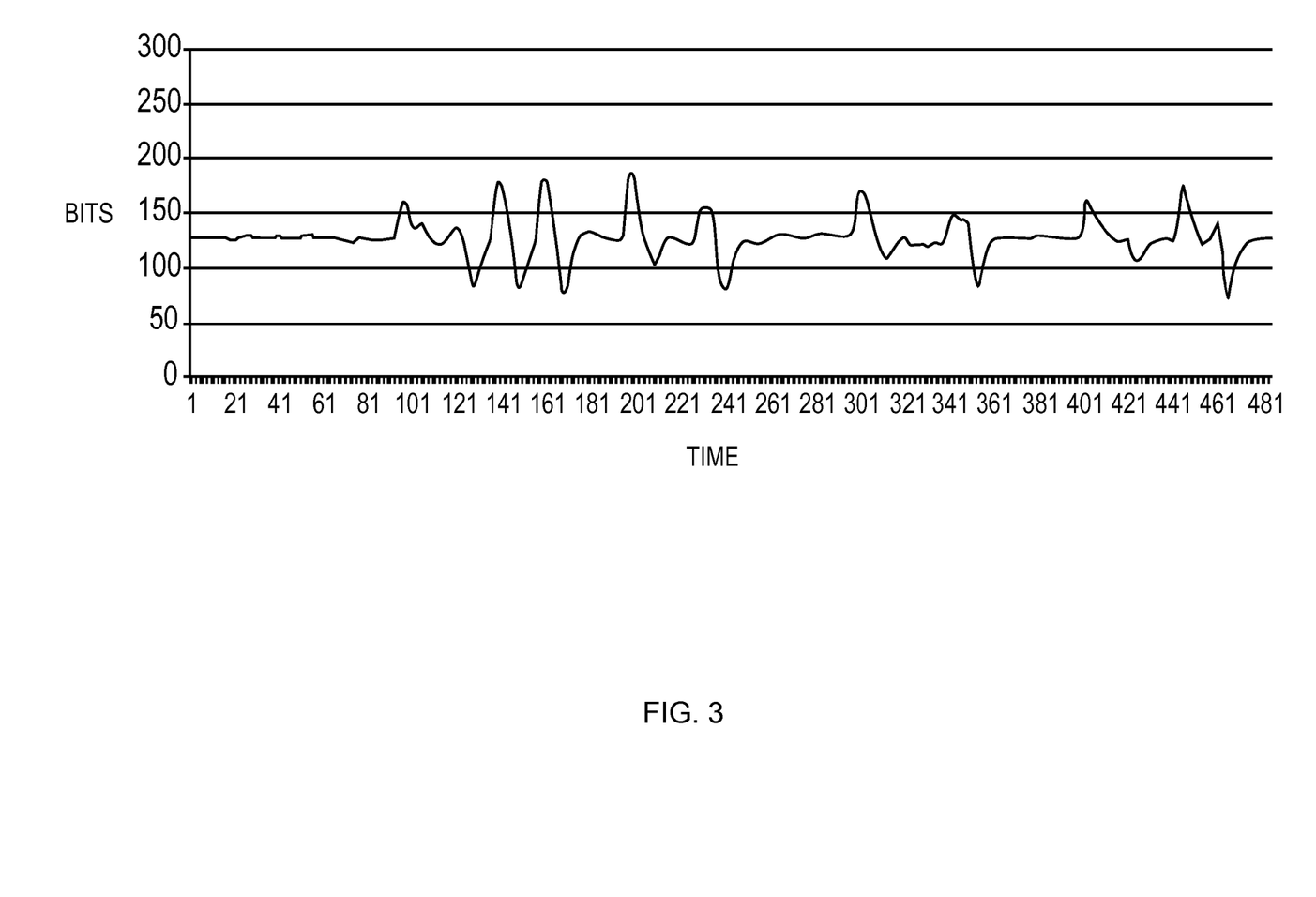
FIG. 3 is a graph depicting an example output signal from a second stage conditioning module with normal gain, but a lower frequency filter cutoff in accordance with embodiments of the present invention.
Figure 4:
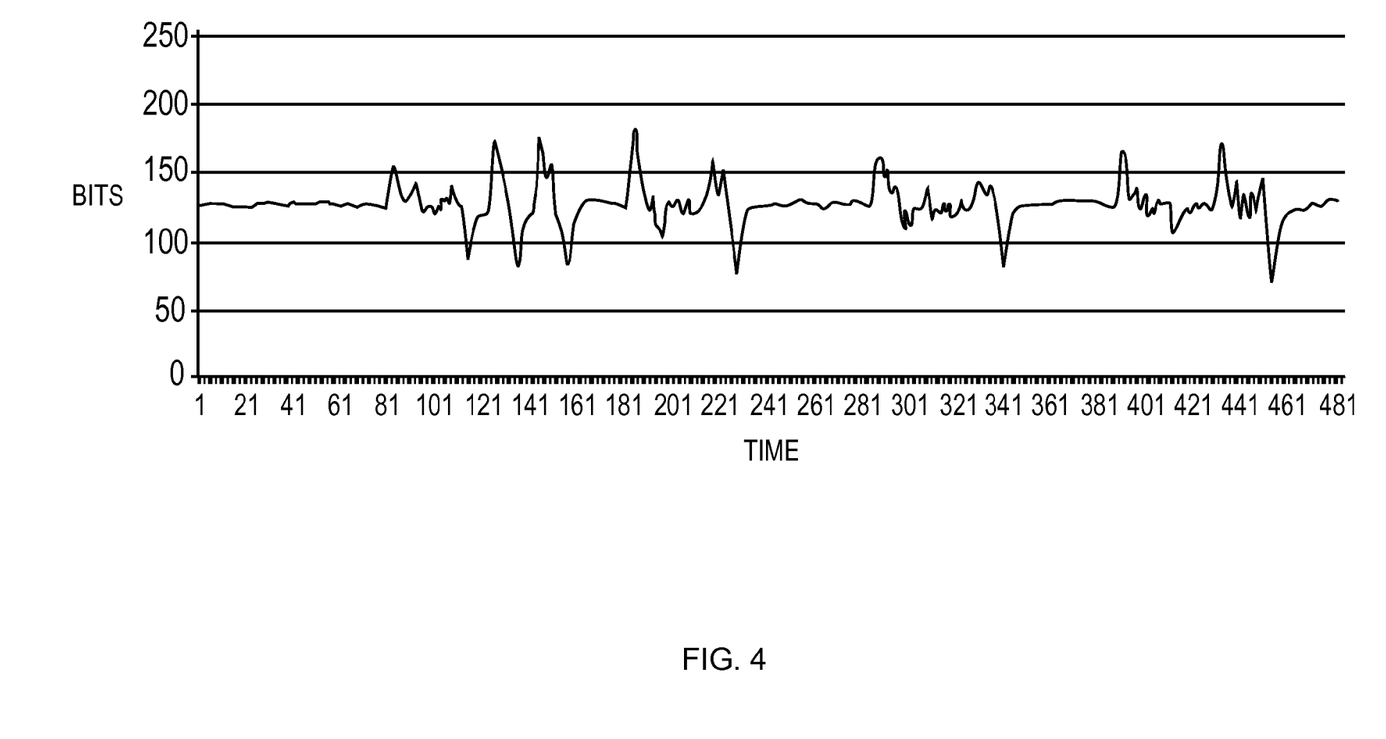
FIG. 4 is a graph depicting an example output signal from a second stage conditioning module with normal gain and normal frequency filter cutoff in accordance with embodiments of the present invention.

FIGS. 3 and 4 are graphs depicting example output signals of a filter and a normal gain amplifier of a second stage conditioning module, respectively, in accordance with embodiments of the present invention. In the example of FIG. 3, the graph shows A/D values plotted for a filter, such as the filter 130 shown in FIG. 1. The example graph show in FIG. 4 shows A/D values plotted for a normal gain amplifier, such as the normal gain filter 128 shown in FIG. 1. In these examples, the filter and amplifier have conditioned an electrical signal generated by a MICR read head after reading a laser printed check. These example graphs demonstrate how multiple small peaks can be removed using an amplifier and filter circuit configured with different filter and gain characteristics. In FIGS. 3 and 4, the horizontal scale is time, which is represented by each sample of an analog waveform taken every 100 microseconds (approximately). The vertical scale is bits ranging from 0 to 255.

The information recognition module 122 may include hardware, software, or firmware configured to execute instructions for analyzing received electrical signals, for selecting one of the electrical signals for use in recognizing encoded information, and for determining the encoded information based on the selected electrical signal in accordance with embodiments disclosed herein. For example, the information recognition module 122 may include one or more processors and memory. The processor(s) may be configured to execute computer program instructions residing on the memory for controlling system components and for implementing various aspects of embodiments of the present invention described herein. The recognition data may be stored in a memory of the system 100 or output to an external device, such as a computer. The information recognition module 122 may output ASCII character codes corresponding to recognized encoded information, such as MICR characters.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or diagrams of methods, apparatus (systems) and computer program products according to embodiments of the invention. For example, aspects of the present invention are described with reference to the diagram of FIG. 1 and the flowchart of FIG. 2. It will be understood that each block of the flowchart illustrations and/or diagrams, and combinations of blocks in the flowchart illustrations and/or diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
   a document reader configured to read encoded information from a document, and to output an electrical signal representative of the encoded information, wherein the document reader comprises a magnetic ink character recognition (MICR) read head configured to read magnetically encoded characters printed on the document;
   a plurality of signal conditioning modules that are each configured to receive the electrical signal, and each to condition the received electrical signal uniquely and provide a conditioned signal; and
   an information recognition module configured to compare each of the conditioned electrical signals from the plurality of signal conditioning modules to a plurality of templates of expected signal characteristics, to eliminate one or more templates based on the comparison, and to select one of the conditioned electrical signals for use in recognizing the encoded information based on one or more templates that were not eliminated.

2. The system of claim 1, wherein each signal conditioning module comprises one of a filter and amplifier.

3. The system of claim 1, wherein at least one of the signal conditioning modules comprises a high gain amplifier.

4. The system of claim 1, wherein at least one of the signal conditioning modules comprises a low gain amplifier.

5. The system of claim 1, wherein at least one of the signal conditioning modules comprises a filter configured for low frequency filter cutoff.

6. The system of claim 1, wherein the signal conditioning modules comprise a high gain amplifier, a normal gain amplifier, a low gain amplifier, and a filter configured for low frequency filter cutoff.

7. The system of claim 1, wherein the information recognition module is configured to determine the encoded information based on the selected one of the conditioned electrical signals.

8. The system of claim 1, comprising another signal conditioning module, other than the plurality of signal conditioning modules, configured to amplify and filter the electrical signal output by the document reader, and to distribute the amplified and filtered electrical signal to each of the signal conditioning modules.

9. The system of claim 1, comprising an analog-to-digital converter configured to:
   receive the conditioned electrical signals output by the signal conditioning modules;
   convert the conditioned signals to a digital signal comprising a plurality of channels that are each representative of one of the conditioned electrical signals; and
   output the digital signal to the information recognition module.

10. A method comprising:
    controlling a document reader comprising a magnetic ink character recognition (MICR) read head to read magnetically encoded characters printed on a document, and to output an electrical signal representative of the encoded characters;

providing the electrical signal to a plurality of signal conditioning modules that each condition the electrical signal uniquely and provide a conditioned signal;

comparing each of the conditioned electrical signals to a plurality of templates of expected signal characteristics;

eliminating one or more templates based on the comparison; and selecting one of the conditioned electrical signals for use in recognizing the encoded information based on one or more templates that were not eliminated.

11. The method of claim 10, further comprising reading the encoded information from the document.

12. The method of claim 10, wherein each signal conditioning module comprises one of a filter and amplifier.

13. The method of claim 10, wherein the signal conditioning modules comprise a high gain amplifier, a normal gain amplifier, a low gain amplifier, and a filter configured for low filter cutoff.

14. The method of claim 10, further comprising determining the encoded information based on the selected one of the conditioned electrical signals.

15. A computer program product for recognizing encoded information on documents, the computer program product comprising:

a non-transitory computer readable storage medium having computer readable program code embodied therewith, the computer readable program code comprising:

computer readable code configured to control a document reader comprising a magnetic ink character recognition (MICR) read head to read magnetically encoded characters printed on a document, and to output an electrical signal representative of the encoded characters;

computer readable code configured to control a plurality of signal conditioning modules to each condition the electrical signal uniquely and provide a conditioned signal;

computer readable code configured to compare each of the conditioned electrical signals to a plurality of templates of expected signal characteristics;

computer readable code configured to eliminate one or more templates based on the comparison; and computer readable code configured to select one of the conditioned electrical signals for use in recognizing the encoded information based on one or more templates that were not eliminated.

16. The computer program product of claim 15, comprising computer readable code configured to control a document reader to read encoded information from the document.

17. The computer program product of claim 15, wherein each signal conditioning module comprises one of a filter and amplifier.

18. The computer program product of claim 15, wherein the signal conditioning modules comprise a high gain amplifier, a normal gain amplifier, a low gain amplifier, and a filter configured for low filter cutoff.

19. The computer program product of claim 15, comprising computer readable code configured to determine the encoded information based on the selected one of the conditioned electrical signals.

20. The computer program product of claim 15, comprising computer readable code configured to control another signal conditioning module, other than the plurality of signal conditioning modules, to amplify and filter the electrical signal output by the document reader.

21. The computer program product of claim 15, comprising computer readable code configured to control an analog-to-digital converter to:

convert the conditioned signals to a digital signal comprising a plurality of channels that are each representative of one of the conditioned electrical signals; and output the digital signal to the information recognition module.

* * * * *